United States Patent
Polleri et al.

(10) Patent No.: US 12,039,004 B2
(45) Date of Patent: Jul. 16, 2024

(54) TECHNIQUES FOR SERVICE EXECUTION AND MONITORING FOR RUN-TIME SERVICE COMPOSITION

(71) Applicant: Oracle International Corporation, Redwood Shores, CA (US)

(72) Inventors: Alberto Polleri, London (GB); Sergio Aldea Lopez, London (GB); Marc Michiel Bron, London (GB); Dan David Golding, London (GB); Alexander Ioannides, London (GB); Maria del Rosario Mestre, London (GB); Hugo Alexandre Pereira Monteiro, London (GB); Oleg Gennadievich Shevelev, London (GB); Larissa Cristina Dos Santos Romualdo Suzuki, Wokingham (GB); Xiaoxue Zhao, London (GB); Matthew Charles Rowe, Milton Keynes (GB)

(73) Assignee: Oracle International Corporation, Redwood Shores, CA (US)

( * ) Notice: Subject to any disclaimer, the term of this patent is extended or adjusted under 35 U.S.C. 154(b) by 881 days.

(21) Appl. No.: 17/019,254

(22) Filed: Sep. 12, 2020

(65) Prior Publication Data
US 2021/0081842 A1 Mar. 18, 2021

Related U.S. Application Data

(60) Provisional application No. 62/900,537, filed on Sep. 14, 2019.

(51) Int. Cl.
*G06N 5/00* (2023.01)
*G06F 8/75* (2018.01)
(Continued)

(52) U.S. Cl.
CPC .............. *G06F 18/213* (2023.01); *G06F 8/75* (2013.01); *G06F 8/77* (2013.01); *G06F 11/3003* (2013.01);
(Continued)

(58) Field of Classification Search
CPC . G06F 11/3433; G06F 18/2115; G06N 20/00; G06N 3/082
See application file for complete search history.

(56) References Cited

U.S. PATENT DOCUMENTS

| | | | |
|---|---|---|---|
| 5,343,527 | A | 8/1994 | Moore |
| 5,699,507 | A | 12/1997 | Goodnow et al. |

(Continued)

FOREIGN PATENT DOCUMENTS

| | | |
|---|---|---|
| CN | 101782976 | 7/2010 |
| CN | 114556322 A | 9/2020 |

(Continued)

OTHER PUBLICATIONS

Amazon SageMaker, Available Online at https://aws.amazon.com/sagemaker/, Accessed from Internet on: Sep. 17, 2020, 13 pages.

(Continued)

*Primary Examiner* — Hal Schnee
(74) *Attorney, Agent, or Firm* — Mughal Gaudry & Franklin PC

(57) ABSTRACT

A server system may receive two or more Quality of Service (QoS) dimensions for the multi-objective optimization model, wherein the two or more QoS dimensions include at least a first QoS dimension and a second QoS dimension. The server system may maximize the multi-objective optimization model along the first QoS dimension, wherein the maximizing includes selecting one or more pipelines for the multi-objective optimization model in the software architecture that meet QoS expectations specified for the first (Continued)

QoS dimension and the second QoS dimension, wherein an ordering of the pipelines is dependent on which QoS dimensions were optimized and de-optimized and to what extent, wherein the multi-objective optimization model is partially de-optimized along the second QoS dimension in order to comply with the QoS expectations for the first QoS dimension, and whereby there is a tradeoff between the first QoS dimension and the second QoS dimension.

20 Claims, 6 Drawing Sheets

(51) Int. Cl.
| | |
|---|---|
| G06F 8/77 | (2018.01) |
| G06F 11/30 | (2006.01) |
| G06F 11/34 | (2006.01) |
| G06F 16/21 | (2019.01) |
| G06F 16/23 | (2019.01) |
| G06F 16/2457 | (2019.01) |
| G06F 16/28 | (2019.01) |
| G06F 16/36 | (2019.01) |
| G06F 16/901 | (2019.01) |
| G06F 16/9035 | (2019.01) |
| G06F 16/907 | (2019.01) |
| G06F 18/10 | (2023.01) |
| G06F 18/2115 | (2023.01) |
| G06F 18/213 | (2023.01) |
| G06F 18/214 | (2023.01) |
| G06N 5/01 | (2023.01) |
| G06N 5/025 | (2023.01) |
| G06N 20/00 | (2019.01) |
| G06N 20/20 | (2019.01) |
| H04L 9/08 | (2006.01) |
| H04L 9/32 | (2006.01) |

(52) U.S. Cl.
CPC ...... *G06F 11/3409* (2013.01); *G06F 11/3433* (2013.01); *G06F 11/3452* (2013.01); *G06F 11/3466* (2013.01); *G06F 16/211* (2019.01); *G06F 16/2365* (2019.01); *G06F 16/24573* (2019.01); *G06F 16/24578* (2019.01); *G06F 16/285* (2019.01); *G06F 16/367* (2019.01); *G06F 16/9024* (2019.01); *G06F 16/9035* (2019.01); *G06F 16/907* (2019.01); *G06F 18/10* (2023.01); *G06F 18/2115* (2023.01); *G06F 18/2155* (2023.01); *G06N 5/01* (2023.01); *G06N 5/025* (2013.01); *G06N 20/00* (2019.01); *G06N 20/20* (2019.01); *H04L 9/088* (2013.01); *H04L 9/0894* (2013.01); *H04L 9/3236* (2013.01)

(56) References Cited

U.S. PATENT DOCUMENTS

| | | | |
|---|---|---|---|
| 9,306,738 B2 | 4/2016 | Loftus et al. | |
| 9,384,450 B1 | 7/2016 | Cordes et al. | |
| 10,198,399 B1 | 2/2019 | Fritchman et al. | |
| 10,417,577 B2 | 9/2019 | Bowers et al. | |
| 10,657,447 B1 | 5/2020 | McDonnell et al. | |
| 11,182,691 B1 | 11/2021 | Zhang | |
| 11,238,377 B2 | 2/2022 | Polleri et al. | |
| 11,663,523 B2 | 5/2023 | Polleri et al. | |
| 11,811,925 B2 | 11/2023 | Polleri et al. | |
| 11,847,578 B2 | 12/2023 | Polleri et al. | |
| 11,921,815 B2 | 3/2024 | Polleri et al. | |
| 2004/0006761 A1 | 1/2004 | Anand et al. | |
| 2005/0102227 A1 | 5/2005 | Solonchev | |
| 2007/0043734 A1 | 2/2007 | Cannon et al. | |
| 2007/0239630 A1 | 10/2007 | Davis et al. | |
| 2008/0133435 A1 | 6/2008 | Chintalapti et al. | |
| 2009/0144698 A1 | 6/2009 | Fanning et al. | |
| 2009/0276389 A1 | 11/2009 | Constantine et al. | |
| 2011/0099532 A1 | 4/2011 | Coldicott et al. | |
| 2013/0204809 A1* | 8/2013 | Bilenko | G06F 18/217 |
| | | | 706/14 |
| 2014/0180738 A1 | 6/2014 | Phillipps et al. | |
| 2015/0170053 A1 | 6/2015 | Miao | |
| 2016/0055426 A1 | 2/2016 | Aminzadeh et al. | |
| 2016/0110657 A1 | 4/2016 | Gibiansky et al. | |
| 2016/0179063 A1 | 6/2016 | De Baynast De Septfontaines et al. | |
| 2016/0275964 A1* | 9/2016 | Kim | G10L 15/20 |
| 2016/0358099 A1 | 12/2016 | Sturlaugson et al. | |
| 2017/0061021 A1 | 3/2017 | Royzner | |
| 2017/0277693 A1 | 9/2017 | Mehedy et al. | |
| 2018/0052824 A1 | 2/2018 | Ferrydiansyah et al. | |
| 2018/0060738 A1 | 3/2018 | Achin et al. | |
| 2018/0060744 A1 | 3/2018 | Achin et al. | |
| 2018/0089593 A1 | 3/2018 | Patel et al. | |
| 2018/0136617 A1 | 5/2018 | Xu et al. | |
| 2018/0314250 A1 | 11/2018 | Lewis et al. | |
| 2018/0314926 A1 | 11/2018 | Schwartz et al. | |
| 2018/0314936 A1 | 11/2018 | Barik et al. | |
| 2018/0322365 A1 | 11/2018 | Yehezkel Rohekar | |
| 2018/0322387 A1 | 11/2018 | Sridharan et al. | |
| 2018/0322403 A1 | 11/2018 | Ron et al. | |
| 2018/0222776 A1 | 12/2018 | MacCartney et al. | |
| 2018/0349447 A1 | 12/2018 | Maccartney et al. | |
| 2018/0349499 A1 | 12/2018 | Pawar et al. | |
| 2019/0108417 A1* | 4/2019 | Talagala | G06N 20/00 |
| 2019/0163758 A1 | 5/2019 | Zhivotvorev et al. | |
| 2019/0228261 A1 | 7/2019 | Chan | |
| 2019/0236894 A1 | 8/2019 | Paradise et al. | |
| 2019/0279114 A1 | 9/2019 | Deshpande et al. | |
| 2019/0317805 A1 | 10/2019 | Metsch et al. | |
| 2019/0334716 A1 | 10/2019 | Kocsis et al. | |
| 2019/0354765 A1 | 11/2019 | Chan et al. | |
| 2020/0081899 A1 | 3/2020 | Shapur et al. | |
| 2020/0151619 A1 | 5/2020 | Mopur et al. | |
| 2020/0210769 A1 | 7/2020 | Hou et al. | |
| 2020/0242510 A1* | 7/2020 | Duesterwald | G06N 20/00 |
| 2020/0333772 A1 | 10/2020 | Srivastava et al. | |
| 2020/0394044 A1* | 12/2020 | Keski-Valkama | G06F 9/3885 |
| 2020/0410011 A1 | 12/2020 | Shi et al. | |
| 2021/0065048 A1* | 3/2021 | Salonidis | G06F 9/542 |
| 2021/0081720 A1 | 3/2021 | Polleri et al. | |
| 2021/0081819 A1 | 3/2021 | Polleri et al. | |
| 2021/0081837 A1 | 3/2021 | Polleri et al. | |
| 2021/0083855 A1 | 3/2021 | Polleri et al. | |
| 2021/0133670 A1 | 5/2021 | Cella et al. | |
| 2021/0174217 A1 | 6/2021 | Pai et al. | |
| 2021/0250305 A1 | 8/2021 | Santo | |
| 2021/0358601 A1 | 11/2021 | Pillai et al. | |
| 2023/0237348 A1 | 7/2023 | Polleri et al. | |
| 2023/0267374 A1 | 8/2023 | Polleri et al. | |
| 2023/0336340 A1 | 10/2023 | Polleri et al. | |

FOREIGN PATENT DOCUMENTS

| | | |
|---|---|---|
| CN | 114586048 A | 9/2020 |
| CN | 114616560 A | 9/2020 |
| WO | 2018111270 | 6/2018 |
| WO | 2018217635 | 11/2018 |
| WO | 2018222776 | 12/2018 |
| WO | 2019236894 | 12/2019 |
| WO | 2019236894 A1 | 12/2019 |
| WO | 2021050382 A1 | 3/2021 |
| WO | 2021050391 A1 | 3/2021 |
| WO | 2021051031 A1 | 3/2021 |

OTHER PUBLICATIONS

AutoKeras, Available Online at https://autokeras.com/, Accessed from Internet on: Sep. 17, 2020, 3 pages.

(56) References Cited

OTHER PUBLICATIONS

Cloud AutoML, Google Cloud, Available Online at https://cloud.google.com/automl/, Accessed from Internet on: Sep. 17, 2020, 3 pages.

Datarobot Flagship Product, "Empowering the Human Heroes of the Intelligence Revolution", Robot, Available Online at https://www.datarobot.com/, 2020, 7 pages.

File Encryption and Decryption Using Python, Eduonix Blog, Available Online at https://blog.eduonix.com/software-development/file-encryption-decryption-using-python/, Nov. 8, 2018, 11 pages.

H20 Driverless AI, Open Source Leader in AI and ML, Available Online at https://www.h2o.ai/products/h2o-driverless-ai/, Accessed from Internet on: Sep. 17, 2020, 12 pages.

Home—Welcome to Mlbox's Official Documentation, MLBox, Machine Learning Box Available Online at https://mlbox.readthedocs.io/en/latest/, Accessed from Internet on: Sep. 17, 2020, 2 pages.

Overview of Kubeflow Pipelines, Kubeflow, Available Online at https://www.kubeflow.org/docs/pipelines/overview/pipelines-overview/, last modified Mar. 8, 2020, Accessed from Internet on: Sep. 17, 2020, 7 pages.

PurePredictive, Available Online at https://www.purepredictive.com/, Accessed from Internet on: Sep. 17, 2020, 3 pages.

SecML: A Library for Secure and Explainable Machine Learning, Released Aug. 6, 2020, Available Online at https://pypi.org/project/secml/, 8 pages.

Set Up Authentication for Azure Machine Learning Resources and Workflows, Azure Machine Learning | Microsoft Docs, Available Online at https://docs.microsoft.com/en-us/azure/machine-learning/how-to-setup-authentication, Jun. 17, 2020, 13 pages.

Tensor flow, The TFX User Guide, Available Online at https://www.tensorflow.org/tfx/guide, Accessed from Internet on: Sep. 17, 2020, 17 pages.

The ModelValidator TFX Pipeline Component (Deprecated), TensorFlow, Last updated Jul. 8, 2020, Available Online at https://www.tensorflow.org/tfx/guide/modelval, Accessed from Internet on: Sep. 17, 2020, 2 pages.

TPOT Automated Machine Learning in Python, Available Online at http://epistasislab.github.io/tpot/, 3 pages.

Track Model Metrics and Deploy ML Models with MLflow and Azure Machine Learning (Preview), Microsoft Docs, Available Online at https://docs.microsoft.com/en-us/azure/machine-learning/how-to-use-mlflow, Jun. 4, 2020, 13 pages.

TransmogrifAI, Atomated machine learning for structured data, salesforce, Available Online at https://transmogrif.ai/, Accessed from Internet on: Sep. 17, 2020, 4 pages.

Using TPOT, Available Online at http://epistasislab.github.io/tpot/using/#crashfreeze-issue-with-n_jobs-1-under-osx-or-linux, 10 pages.

Waymo: Automated Model Selection for Self-Driving Vehicles, Available Online at https://waymo.com/, Accessed from Internet on: Sep. 17, 2020, 5 pages.

What is Automated Machine Learning (AutoML)?, Microsoft Docs, Available Online at https://docs.microsoft.com/en-us/azure/machine-learning/concept-automated-ml, Apr. 22, 2020, 13 pages.

Xpanse AI, The power of AI at the click of a button. Automated Data Science, Available Online at https://xpanse.ai/, Accessed from Internet on: Sep. 17, 2020, 4 pages.

Abrams, Machine Learning Model Pipelines: Part I, Hacker Noon, Available Online at https://hackernoon.com/machine-learning-model-pipelines-part-i-e138b7a7c1ef, Aug. 29, 2018, 10 pages.

Altunay et al., Generate Machine Learning Model Pipelines to Choose the Best Model for Your Problem, AutoAI, IBM Developer, Available Online at https://developer.ibm.com/tutorials/generate-machine-learning-model-pipelines-to-choose-the-best-model-for-your-problem-autoai/, Aug. 19, 2019, 11 pages.

Gordon, AI & Security Innovations Help Developers Preserve Privacy While Delivering Insight, Available Online at https://software.intel.com/content/www/us/en/develop/articles/ai-security-innovations-help-developers-preserve-privacy-while-delivering-insight.html, Jun. 18, 2019, 6 pages.

Jarmul; Katharine, "Privacy Attacks on Machine Learning Models", Virtual Event, InfoQLive: Delivering Technology Through Software Engineering Leadership, Sep. 23, 2020. Available Online at https://www.infoq.com/articles/privacy-attacks-machine-learning-models/, Accessed from Internet on: Sep. 16, 2020, 7 pages.

Lariffle, OpenMined/PySyft, GitHub—OpenMined/PySyft: A library for answering questions using data you cannot see, Available Online at https://github.com/OpenMined/PySyft, Accessed from Internet on: Sep. 16, 2020, 7 pages.

Lokuciejewski et al., Automatic Selection of Machine Learning Models for Compiler Heuristic Generation, Available Online at https://www.semanticscholar.org/paper/Automatic-Selection-of-Machine-Learning-Models-for-Lokuciejewski-Stolpe/5f4d110827f0e43eec77f6b78f02acd8550cc8b9?p2df, 2013, 15 pages.

Luo, A Review of Automatic Selection Methods for Machine Learning Algorithms and Hyper-Parameter Values, Network Modeling Analysis in Health Informatics and Bioinformatics, vol. 5, No. 18, May 23, 2016, pp. 1-16.

Mohr et al., Towards the Automated Composition of Machine Learning Services, 2018 IEEE International Conference on Services Computing (SCC), 2018, pp. 241-244.

Neustadter, Why AI Needs Security, Available Online at https://www.synopsys.com/designware-ip/technical-bulletin/why-ai-needs-security-dwtb-q318.html, Accessed from Internet on: Sep. 16, 2020, 9 pages.

Pathak, TPOT in Python, DataCamp, Available Online at https://www.datacamp.com/community/tutorials/tpot-machine-learning-python, Sep. 21, 2018, 18 pages.

Sparks et al., KeystoneML: Optimizing Pipelines for Large-Scale Advanced Analytics, 2017 IEEE 33rd International Conference on Data Engineering (ICDE), Apr. 2017, pp. 1-15.

Xu et al., CryptoNN: Training Neural Networks over Encrypted Data, Available Online at http://www.lichao.work/files/2019-C-ICDCS.pdf, Apr. 15, 2019, 11 pages.

Zoller et al., Benchmark and Survey of Automated Machine Learning Frameworks, Journal of Artificial Intelligence Research 1, 1993, pp. 1-65.

U.S. Appl. No. 18/132,859, filed Apr. 10, 2023, Alberto Polleri.

Non-Final Office Action for U.S. Appl. No. 16/893,189, dated Aug. 2, 2022.

Notice of Allowance for U.S. Appl. No. 16/892,724, dated Aug. 26, 2022.

Notice of Allowance for U.S. Appl. No. 16/892,935 dated Nov. 25, 2022.

Notice of Allowance for U.S. Appl. No. 16/893,189, dated Jan. 19, 2023.

Notice of Allowance for U.S. Appl. No. 16/893,193, dated Sep. 16, 2022.

Notice of Allowance for U.S. Appl. No. 17/019,255, dated Nov. 2, 2021.

Notice of Allowance for U.S. Appl. No. 17/019,256, dated Jul. 19, 2023.

Notice of Allowance for U.S. Appl. No. 18/100,458, dated Aug. 9, 2023.

Office Action for U.S. Appl. No. 17/019,258, dated Aug. 7, 2023.

Office Action for U.S. Appl. No. 18/100,458, dated May 23, 2023.

U.S. Appl. No. 17/019,255, Notice of Allow ance dated Nov. 2, 2021, 9 pages.

U.S. Appl. No. 16/893,073, Non-Final Office Action dated Dec. 20, 2021, 13 pages.

U.S. Appl. No. 16/892,724, Non-Final Office Action dated May 5, 2022, 12 pages.

U.S. Appl. No. 16/892,935, First Action Interview Pilot Program Pre-Interview Communication dated Aug. 12, 2022, 4 pages.

U.S. Appl. No. 16/893,189, Non-Final Office Action dated Aug. 2, 2022, 8 pages.

U.S. Appl. No. 16/893,193, First Action Interview Pilot Program Pre-Interview Communication dated Jun. 8, 2022, 6 pages.

U.S. Appl. No. 16/892,724, Notice of Allowance dated Aug. 26, 2022, 8 pages.

Sacha, et al., VIS4ML: An Ontology for Visual Analytics Assisted Machine Learning, IEEE Transactions on Visualization and Computer Graphics, vol. 25, No. 1, pp. 385-395, Jan. 1, 2019.

(56) References Cited

OTHER PUBLICATIONS

International Application No. PCT/US2020/049429, International Search Report and Written Opinion dated Nov. 27, 2020, 14 pages.
International Application No. PCT/US2020/049500, International Search Report dated Nov. 27, 2020, 11 pages.
International Application No. PCT/US2020/050600, International Search Report and Written Opinion dated Nov. 27, 2020, 13 pages.
Notice of Allowance for U.S. Appl. No. 17/019,258, dated Nov. 3, 2023.
Non-Final Office Action for U.S. Appl. No. 18/132,859, dated May 6, 2024.
Non-Final Office Action for U.S. Appl. No. 18/501,716, dated May 15, 2024.

* cited by examiner

TECHNIQUES FOR SERVICE EXECUTION AND MONITORING FOR RUN-TIME SERVICE COMPOSITION

CROSS-REFERENCE TO RELATED APPLICATIONS

This application claims priority of U.S. Provisional Patent Application No. 62/900,537 filed Sep. 14, 2019, entitled "AUTOMATED MACHINE-LEARNING SYSTEMS AND METHODS", which is hereby incorporated by reference in its entirety and for all purposes.

FIELD

The present disclosure relates to systems and techniques for machine learning. More particularly, the present disclosure relates to systems and techniques for generating and managing a library of machine-learning applications.

BACKGROUND

Machine-learning has a wide range of applications, such as search engines, medical diagnosis, text and handwriting recognition, image processing and recognition, load forecasting, marketing and sales diagnosis, chatbots, autonomous driving, and the like. Various types and versions of machine-learning models may be generated for similar applications using training data based on different technologies, languages, libraries, and the like, and thus may lack interoperability. In addition, different models may have different performances in different contexts and/or for different types of input data. Data scientists may not have the programming skills to generate the code necessary to build custom machine-learning models. In addition, available machine-learning tools do not store the various machine-learning model components as part of a library to allow for efficient reuse of routines in other machine-learning models.

Existing machine-learning applications can require considerable programming knowledge by a data scientist to design and construct a machine-learning application to solve specific problems. Intuitive interfaces can assist the data scientist construct a machine-learning application through a series of queries.

Some organizations can store data from multiple clients or suppliers with customizable schemas. These customizable schemas may not match standardized data storage schemas used by existing machine-learning models. Therefore, these other systems would need to perform a reconciliation process prior to using the stored data. The reconciliation process can be either a manual process or through a tedious extract, transform, load automated process prior to using the data for generating machine-learning applications.

Machine-learning applications based only on metrics (e.g., Quality of Service (QoS) or Key Performance Indicators) may not be sufficient to compose pipelines with minimal human intervention for a self-adaptive architecture. Pre-existing machine-learning tools do not combine non-logical based and logic-based semantic services to generate a machine-learning application.

One or more changes due to: changes in the system environment, data corruption, concept drift, and availability of new data can affect the outcome of the machine-learning model. Existing machine-learning applications do not predict the effects of these changes or automatically identify and execute remedial measures to mitigate for these changes.

BRIEF SUMMARY

Certain aspects and features of the present disclosure relate to machine-learning platform that generates a library of components to generate machine-learning models and machine-learning applications. The machine-learning infrastructure system allows a user (i.e., a data scientist) to generate machine-learning applications without having detailed knowledge of the cloud-based network infrastructure or knowledge of how to generate code for building the model. The machine-learning platform can analyze the identified data and the user provided desired prediction and performance characteristics to select one or more library components and associated application-programming interface (API) to generate a machine-learning application. The machine-learning techniques can monitor and evaluate the outputs of the machine-learning model to allow for feedback and adjustments to the model. The machine-learning application can be trained, tested, and compiled for export as stand-alone executable code.

The machine-learning platform can generate and store one or more library components that can be used for other machine-learning applications. The machine-learning platform can allow users to generate a profile which allows the platform to make recommendations based on a user's historical preferences. The model creation engine can detect the number and type of infrastructure resources necessary to achieve the desired results within the desired performance criteria.

According to some implementations, a method may include receiving two or more Quality of Service (QoS) dimensions for the multi-objective optimization model. The two or more QoS dimensions include at least a first QoS dimension and a second QoS dimension. The method may include maximizing the multi-objective optimization model along the first QoS dimension. The maximizing includes selecting one or more pipelines for the multi-objective optimization model in the software architecture that meet QoS expectations specified for the first QoS dimension and the second QoS dimension. An ordering of the pipelines can be dependent on which QoS dimensions were optimized and de-optimized and to what extent. The multi-objective optimization model can be partially de-optimized along the second QoS dimension in order to comply with the QoS expectations for the first QoS dimension. Whereby there is a tradeoff between the first QoS dimension and the second QoS dimension.

According to some implementations, a non-transitory computer-readable medium may store one or more instructions. The one or more instructions, when executed by one or more processors of a server system, may cause the one or more processors to: receiving two or more Quality of Service (QoS) dimensions for the multi-objective optimization model, wherein the two or more QoS dimensions include at least a first QoS dimension and a second QoS dimension; maximizing the multi-objective optimization model along the first QoS dimension, wherein the maximizing includes selecting one or more pipelines for the multi-objective optimization model in the software architecture that meet QoS expectations specified for the first QoS dimension and the second QoS dimension, wherein an ordering of the pipelines is dependent on which QoS dimensions were optimized and de-optimized and to what extent, wherein the multi-objective optimization model is partially de-optimized along the second QoS dimension in order to comply with the QoS expectations for the first QoS dimension, and whereby there is a tradeoff between the first QoS dimension and the second QoS dimension.

According to some implementations, a method may include retrieving data associated with a historical output of a machine-learning model as compared with a set of Quality of Service metrics and Key Performance Indicator Metrics. The method can include receiving one or more inputs from an environment monitoring agent. The environment monitoring agent can receive information on at least one of: resources of a system, concepts of the machine-learning model, data corruption, and data availability to the machine-learning model. The method can include determining a change in at least one of: the resources of the system, the concepts of the machine-learning model, the data corruption, and the data availability to the machine-learning model. The method can include determining whether the change in the at least one of the resources of the system, the concepts of the machine-learning model, the data corruption, and the data availability to the machine-learning model will cause a predicted output of the machine-learning model to vary more than a predetermined amount. When the change in the at least one of the resources of the system, the concepts of the machine-learning model, the data corruption, and the data availability to the machine-learning model will cause the predicted output of the machine-learning model to vary more than a predetermined amount, the method can include identifying one or more remedial measures to the machine-learning model to correct for the change. The method can include displaying an alert to notify a user of the change in the at least one of the resources of the system, the concepts of the machine-learning model, the data corruption, and the data availability to the machine-learning model and the one or more remedial measures.

According to some implementations, a non-transitory computer-readable medium may store one or more instructions. The one or more instructions, when executed by one or more processors of a cloud-based server system, may cause the one or more processors to: retrieve data associated with a historical output of a machine-learning model as compared with a set of Quality of Service metrics and Key Performance Indicator Metrics. The instructions can cause the one or more processors to receive one or more inputs from an environment monitoring agent. The environment monitoring agent receives information on at least one of: resources of a system, concepts of the machine-learning model, data corruption, and data availability to the machine-learning model. The instructions can cause the one or more processors to determine a change in at least one of: the resources of the system, the concepts of the machine-learning model, the data corruption, and the data availability to the machine-learning model. The instructions can cause the one or more processors to determine whether the change in the at least one of the resources of the system, the concepts of the machine-learning model, the data corruption, and the data availability to the machine-learning model will cause a predicted output of the machine-learning model to vary more than a predetermined amount. When the change in the at least one of the resources of the system, the concepts of the machine-learning model, the data corruption, and the data availability to the machine-learning model will cause the predicted output of the machine-learning model to vary more than a predetermined amount, the instructions can cause the one or more processors to identifying one or more remedial measures to the machine-learning model to correct for the change. The instructions can cause the one or more processors to display an alert to notify a user of the change in the at least one of the resources of the system, the concepts of the machine-learning model, the data corruption, and the data availability to the machine-learning model and the one or more remedial measures.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
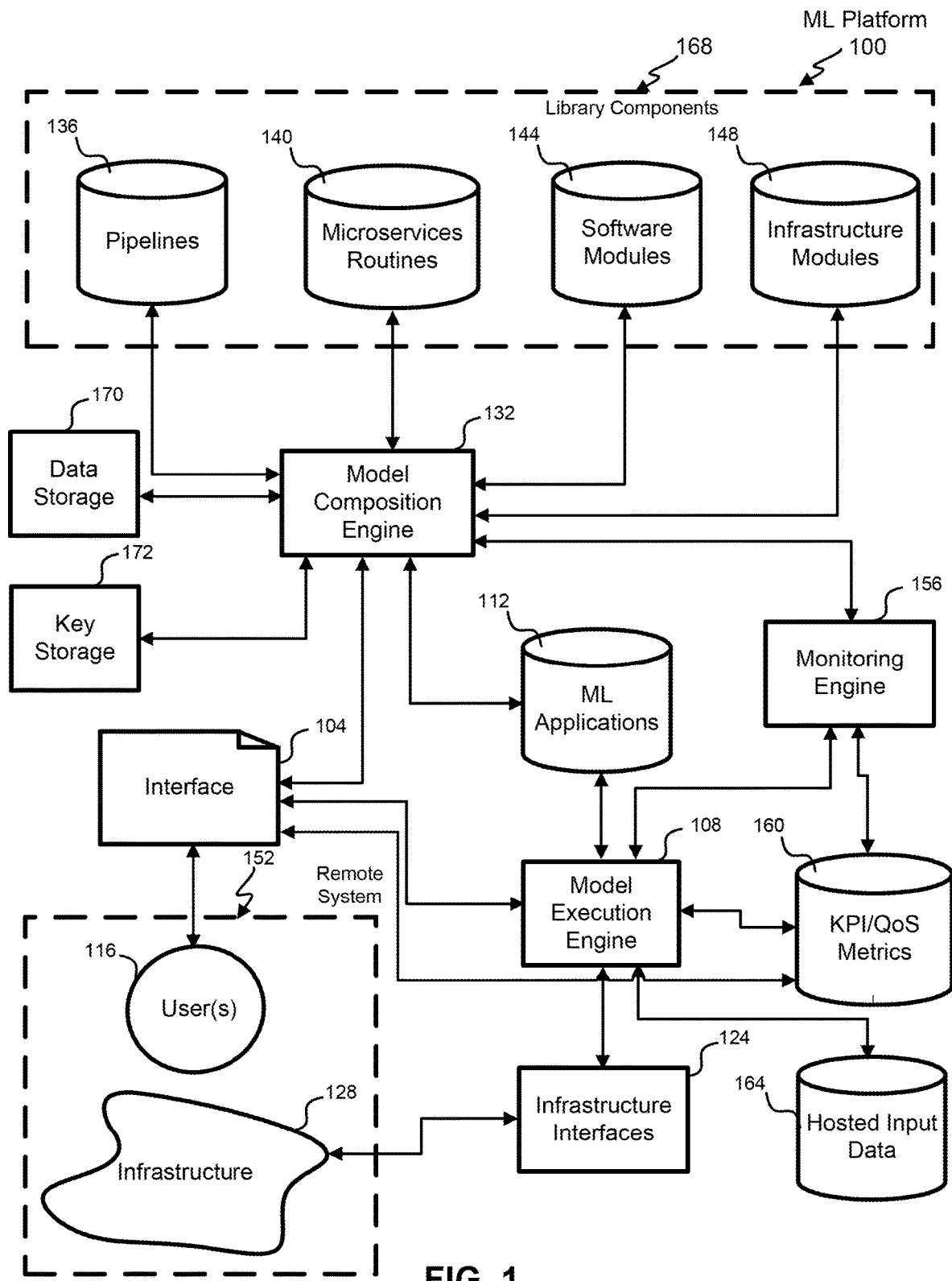
FIG. 1 is a block diagram illustrating an exemplary machine-learning infrastructure system.

Certain embodiments of the present disclosure relate to systems, devices, computer-readable medium, and computer-implemented methods for implementing various techniques for machine learning. The machine-learning techniques can allow a user (i.e., a data scientist) to generate machine-learning applications without having detailed knowledge of the cloud-based network infrastructure or knowledge of how to generate code for building the model. The machine-learning platform can analyze the identified data and the user provided desired prediction and performance characteristics to select one or more library components and associated API to generate a machine-learning application.

The machine-learning techniques can employ a chatbot to indicate the location of data, select a type of machine-learning solution, display optimal solutions that best meet the constraints, and recommend the best environment to deploy the solution.

The techniques described herein can include a self-adjusting corporation-wide discovery and integration feature can review a client's data store, review the labels for the various data schema, and effectively map the client's data schema to classifications used by the machine-learning model. The various techniques can automatically select the features that are predictive for each individual use case (i.e., one client), effectively making a machine-learning solution client-agnostic for the application developer. A weighted list of common representations of each feature for a particular machine-learning solution can be generated and stored.

The techniques can utilize existing data ontologies for generating machine-learning solutions for a high-precision search of relevant services to compose pipelines with minimal human intervention. For data sets without existing ontologies, one or more ontologies be generated.

The techniques can employ an adaptive pipelining composition service to identify and incorporate or more new models into the machine-learning application. The machine-learning application with the new model can be tested off-line with the results being compared with ground truth data. If the machine-learning application with the new model outperforms the previously used model, the machine-learning application can be upgraded and auto-promoted to production.

A cloud-based server system can include a monitoring engine that can receive information on at least one of: resources of a system, concepts of the machine-learning model, data corruption, and data availability to the machine-learning model. The monitoring engine can determine whether the change will cause a predicted output of the machine-learning model to vary more than a predetermined amount. The monitoring engine can identify one or more remedial measures to the machine-learning model to correct for the change. In at least one embodiment, the cloud-based server system may display an alert to notify a user of the change in the at least one of the resources of the system, the concepts of the machine-learning model, the data corruption, and the data availability to the machine-learning model and the one or more remedial measures.

I. Machine-Learning Infrastructure Platform

FIG. 1 is a block diagram illustrating an exemplary machine-learning platform 100 for generating a machine-learning model. The machine-learning platform 100 has various components that can be distributed between different networks and computing systems. A machine-learning infrastructure library can store one or more components for generating machine-learning applications 112. All of the infrastructure required to productionize the machine-learning applications 112 can be encapsulated and stored in the library.

Machine-learning configuration and interaction with the model composition engine 132 allows for selection of various library components 168 (e.g., pipelines 136 or workflows, micro services routines 140, software modules 144, and infrastructure modules 148) to define implementation of the logic of training and inference to build machine-learning applications 112. Different parameters, variables, scaling, settings, etc. for the library components 168 can be specified or determined by the model composition engine 132. The complexity conventionally required to create the machine-learning applications 112 can be performed largely automatically with the model composition engine 132.

The library components 168 can be scalable to allows for the definition of multiple environments (e.g., different Kubernetes clusters) where the various portions of the application can be deployed to achieve any Quality of Service (QoS) or Key Performance Indicators (KPIs) specified. A Kubernetes cluster is a set of node machines for running containerized applications. The scalability can hide or abstract the complexity of the machine-learning platform 100 from the application developer. A monitoring engine 156 can monitor operation of the machine-learning applications 112 according to the KPI/QoS metrics 160 to assure the machine-learning application 112 is performing according to requirements. In addition the monitoring engine 156 can seamlessly test end-to-end a new or evolving machine-learning application at different scales, settings, loading, settings, etc. The monitoring engine 156 can recommend various adjustments to the machine-learning application 112 by signaling needed changes to the model composition engine 132.

To address scalability in some embodiments, the machine-learning platform 100 creates infrastructure, which is based on a micro services architecture, making it robust and scalable. For example, various micro services routines 140 and infrastructure modules 148 can be configured and customized for embedding into the machine-learning application 112. The machine-learning platform 100 can allow a developer to define the amount of resources (e.g. CPU, memory) needed for different library components 168 of the machine-learning application 112.

The machine-learning platform 100 can generate highly customizable applications. The library components 168 contain a set of predefined, off-the-shelf workflows or pipelines 136, which the application developer can incorporate into a new machine-learning application 112. A workflow specifies various micro services routines 140, software modules 144 and/or infrastructure modules 148 configured in a particular way for a type or class of problem. In addition to this, it is also possible to define new workflows or pipelines 136 by re-using the library components or changing an existing workflow or pipeline 136. The infrastructure modules 148 can also include services such as data gathering, process monitoring, and logging.

A model composition engine 132 can be executed on one or more computing systems (e.g., infrastructure 128). The model composition engine 132 can receive inputs from a user 116 through an interface 104. The interface 104 can include various graphical user interfaces with various menus and user selectable elements. The interface 104 can include a chatbot (e.g., a text based or voice based interface). The user 116 can interact with the interface 104 to identify one or more of: a location of data, a desired prediction of machine-learning application, and various performance metrics for the machine-learning model. The model composition engine 132 can interface with library components 168 to identify various pipelines 136, micro service routines 140, software modules 144, and infrastructure models 148 that can be used in the creation of the machine-learning model 112.

The model composition engine 132 can output one or more machine-learning applications 112. The machine-learning applications 112 can be stored locally on a server or in a cloud-based network. The model composition engine 132 can output the machine-learning application 112 as executable code that be run on various infrastructure 128 through the infrastructure interfaces 124.

The model execution engine 108 can execute the machine-learning application 112 on infrastructure 128 using one or more the infrastructure interfaces 124. The infrastructure 128 can include one or more processors, one or more memories, and one or more network interfaces, one or more buses and control lines that can be used to generate, test, compile, and deploy a machine-learning application 112. In various embodiments, the infrastructure 128 can exit on a remote system 152 that is apart from the location of the user 116. The infrastructure 128 can interact with the model execution engine 108 through the infrastructure interfaces 124 The model execution engine 108 can input the performance characteristics (e.g., KPI/QoS metrics storage 160) and the hosted input data 164. The model execution engine 108 can generate one or more results from the machine-learning application 112.

The KPI/QoS metrics storage 160 can store one or more metrics that can be used for evaluating the machine-learning application 112. The metrics can include inference query metrics, performance metrics, sentiment metrics, and testing metrics. The metrics can be received from a user 116 through a user interface 104.

The monitoring engine 156 can receive the results of the model execution engine 108 and compare the results with the performance characteristics (e.g., KPI/QoS metrics 160). The monitoring engine 156 can use ground truth data to test the machine-learning application 112 to ensure the model can perform as intended. The monitoring engine 156 can provide feedback to the model composition engine 132. The feedback can include adjustments to one or more variables or selected machine-learning model used in the machine-learning model 112.

The library components 168 can include various pipelines 136, micro service routines 140, software modules 144, and infrastructure modules 148. Software pipelines 136 can consist of a sequence of computing processes (e.g., commands, program runs, tasks, threads, procedures, etc.).

Micro services routines 140 can be used in an architectural approach to building applications. As an architectural framework, micro services are distributed and loosely coupled, to allow for changes to one aspect of an application without destroying the entire application. The benefit to using micro services is that development teams can rapidly build new components of applications to meet changing development requirements. Micro service architecture breaks an application down into its core functions. Each function is called a service, and can be built and deployed independently, meaning individual services can function (and fail) without negatively affecting the others. A micro service can be a core function of an application that runs independent of other services. By storing various micro service routines 140, the machine-learning platform 100 can generate a machine-learning application incrementally by identifying and selecting various different components from the library components 168.

Software modules 144 can include batches of code that form part of a program that contains one or more routines. One or more independently developed modules make up a program. An enterprise-level software application can contain several different software modules 144, and each module can serve unique and separate operations. A module interface can express the elements that are provided and required by the module. The elements defined in the interface can be detectable by other modules. The implementation can contain the working code that corresponds to the elements declared in the interface. Modular programming can be related to structured programming and object-oriented programming, all having the same goal of facilitating construction of large software programs and systems by decomposition into smaller pieces. While the historical usage of these terms has been inconsistent, "modular programming" as used herein refers to high-level decomposition of the code of an entire program into pieces: structured programming to the low-level code use of structured control flow, and object-oriented programming to the data use of objects, a kind of data structure. In object-oriented programming, the use of interfaces as an architectural pattern to construct modules is known as interface-based programming.

Infrastructure modules 148 can include the technology stack necessary to get machine-learning algorithms into production in a stable, scalable and reliable way. A technology stack can include set of software subsystems or components needed to create a complete platform such that no additional software is needed to support applications. For example, to develop a web application the architect defines the stack as the target operating system, web server, database, and programming language. Another version of a software stack is operating system, middleware, database, and applications. The components of a software stack can be developed by different developers independently from one another. The stack can extend from the data science tools used to select and train machine-learning algorithms down to the hardware those algorithms run on and the databases and message queues from which they draw the datasets.

The machine-learning platform 100 can include one or more data storage locations 170. The user can identify the one or more data storage locations 170. The data storage location 170 can be local (e.g., in a storage device electrically connected to the processing circuitry and interfaces used to generate, test, and execute the application). In various embodiments the data storage location 170 can be remote (e.g., accessible through a network such as a Local Area Network or the Internet). In some embodiments, the data storage location 170 can be a cloud-based server.

The data used for the machine-learning model 112 often includes personally-identifiable information (PII), and thus, triggers certain safeguards provided by privacy laws. One way to protect the information contained in the data storage 170 can be to encrypt the data using one or more keys. Public-key cryptography, or asymmetric cryptography, is a cryptographic system that uses pairs of keys: public keys which may be disseminated widely, and private keys which are known only to the owner of the data. The private keys can be stored in the key storage 172 module to enable decrypting data for use by the machine-learning platform 100.

The model execution engine 108 can use hosted input data 164 to execute and test the machine-learning application 112. The hosted input data 164 can include a portion of the data stored at the data storage 170. In various embodiments, a portion of the hosted input data 164 can be identified as testing data.

II. Service Execution and Monitoring for Run-Time Service Composition

During the execution of a machine-learning service or pipeline, the environment is in constant change and can therefore invalidate the desired state defined by the user. The invalid state could include changes in the environment, data corruption, model performance degradation, and/or the availability of new features. One purpose of the monitoring engine 156 is to provide the model composition engine 132 and the model execution engine 108 with an up-to-date view of the state of the execution environment for the machine-learning platform 100 and complying with the QoS specifications defined when the machine-learning service was composed.

Machine-learning services and their ontologies are defined in deployable service descriptions, which are used by the model composition engine 132 to assemble a composite service to trigger search for the best architectural model for run-time. The architectural model includes a pipeline 136 specifying any microservices routines 140, software modules 144, and infrastructure modules 148 along with any customizations and interdependencies. Multiple QoS parameters (e.g., response time, latency, throughput, reliability, availability, success rate) as associated with a service execution based also on the type of data inputted in the pipeline (volume, velocity), class of pipelines (classifier, recommender system), thereby, service composition with a large number of candidate services is a multi-objective optimization problem that we could solve to automate the run-time adaption. During service composition, multiple services can combined in a specific order based on their input-output dependencies to produce a desired product graph that besides providing a solution required by a pipeline X with Data Input Y, it is also necessary to ensure fulfillment of end-to-end QoS requirements specified by the product team (KPIs) and the environment we are running. An Execution Engine schedules and invokes machine-learning service instances to be composed and served at run-time.

A number of variations and modifications of the disclosed embodiments can also be used. For example, various functions, blocks, and/or software can be distributed over a network, WAN and/or cloud encapsulated. The machine-learning software can be run in a distributed fashion also across a network, WAN and/or cloud infrastructure.

Figure 2:
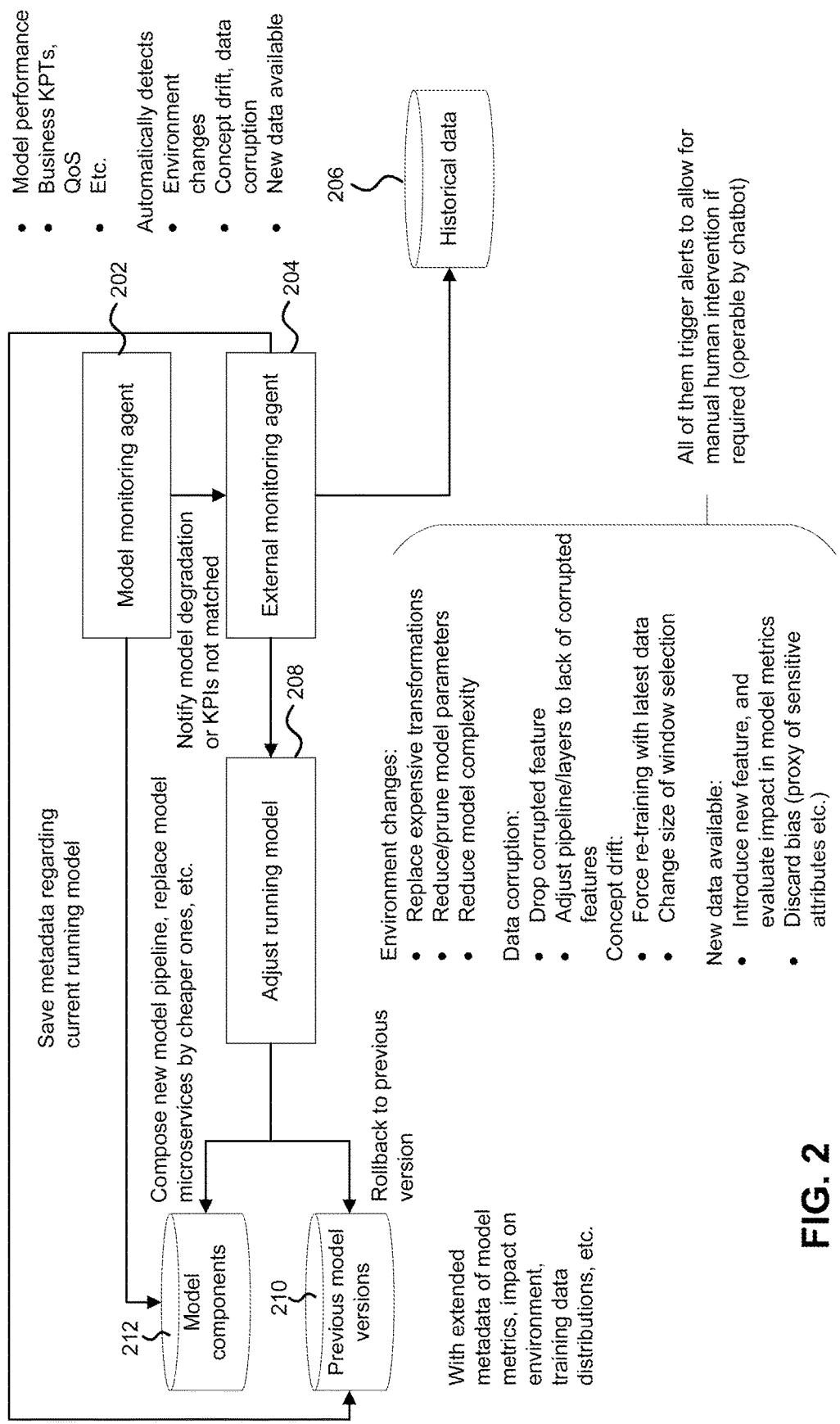
FIG. 2 illustrates a diagram of a system for service execution and monitoring for run-time service composition.

FIG. 2 illustrates a simplified diagram of a system for service execution and monitoring for run-time service composition. The system can detect when one or more conditions exist that can degrade the performance of the machine-learning model. The system can identify one or more measures that can be taken that can prevent, mitigate, or resolve any issues caused by a change in the at least one of the resources of the system, the concepts of the machine-learning model, the data corruption, and the data availability to the machine-learning model.

The model-monitoring agent 202 can monitor the environment of the system and the performance of the machine-learning model. The model-monitoring agent 202 can monitor both the historical performance of the model and the performance of the model as compared with the Key Performance Indicators (KPIs) and Quality of Service metrics.

The model-monitoring agent 202 can monitor for concept drift. In the real world concepts are often not stable but change with time. Typical examples of this are weather prediction rules and customers' preferences. The underlying data distribution may change as well. Often these changes make the model built on old data inconsistent with the new data, and regular updating of the model is necessary. This problem, can be known as concept drift, complicates the task of learning a model from data and requires special approaches, different from commonly used techniques, which treat arriving instances as equally important contributors to the final concept. The monitoring engine 202 can monitor the customer data to detect if concept drift is a potential issue for the machine-learning application.

The model-monitoring agent 202 can monitor for data corruption. Data corruption refers to errors in computer data that occur during writing, reading, storage, transmission, or processing, which introduce unintended changes to the original data. Computer, transmission, and storage systems can use a number of measures to provide end-to-end data integrity, or lack of errors. In general, when data corruption occurs a file containing that data can produce unexpected results when accessed by the system or the related application. Results could range from a minor loss of data to a system crash. For example, if a document file is corrupted, when a person tries to open that file with a document editor they may get an error message, thus the file might not be opened or might open with some of the data corrupted (or in some cases, completely corrupted, leaving the document unintelligible). The model-monitoring agent 202 can monitor the data and detect potential issues with data corruption.

The model-monitoring agent 202 can monitor for new customer data. The new customer data can include different types of data that may have been previously unavailable to the model. The model-monitoring agent 202 can not only detect the presence of additional data of the same type used by the model, but it can detect new types of data that may provide for better predictions.

The model-monitoring agent 202 can notify a user of model degradation or if KPIs are not being met or are not currently capable of being met.

An external monitoring agent 204 can detect one or more environment changes. The environment changes can include changes to available memory. The environment changes can include changes to the availability of processing nodes. The environment changes can include changes to the network bandwidth.

The external monitoring agent 204 can access historical data 206. The historical data 206 can be used to compare the projected output of the model. If the projected output is within an acceptable range of the historical data, perhaps no remedial measures need to be taken. It is possible that the redial measures would result in other issues that are potentially worse than any changes to the system. The external monitoring agent can also save the output of the model to the database for future monitoring. In various embodiments, the historical data 206 can store a historical collection of problems and the solutions or remedial actions given to them. This would lean the application differently, towards making adjusting running a machine-learning model, at 208, to get predicted remedial actions.

At 208, the system can adjust the running model. The system can make one or more changes to prevent, mitigate, or resolve any issues presented by the system changes detected by the model-monitoring agent 202 and the external monitoring agent 204.

For some environment changes, the system can replace processing, memory, or bandwidth expensive transformations. Other remedial measures can include replacing or pruning one or more model parameters. The reduced model parameters reduce the requirements for the model. In various embodiments, the system can reduce the model complexity by changing out one or more of the library components.

For data corruption, the system can temporarily drop or remove the corrupted feature. In various embodiments, the system can adjust pipeline/or layers to remove the corrupted features.

For concept drift issues, the system can force-retraining of the model using the different data. In various embodiments, the different data include the latest data. In various embodiments, force concept drift issues can be resolved by changing the size of window selections to avoid corrupted data.

For cases of new data becoming available, the system can analyze the data to discover one or more new features. The system can evaluate the impact of the new data on the model metrics. In various embodiments, the system can discard any bias due to sensitive attributes.

In some embodiments the system can roll back to a previous model version 210 to mitigate one or more issues detected. In some embodiments, the system can use one or more model components 212 to compose a new model pipeline, replace model microservices with different components. The system can save metadata regarding the current running model. The metadata can be monitored by the external monitoring agent 204.

Figure 3:
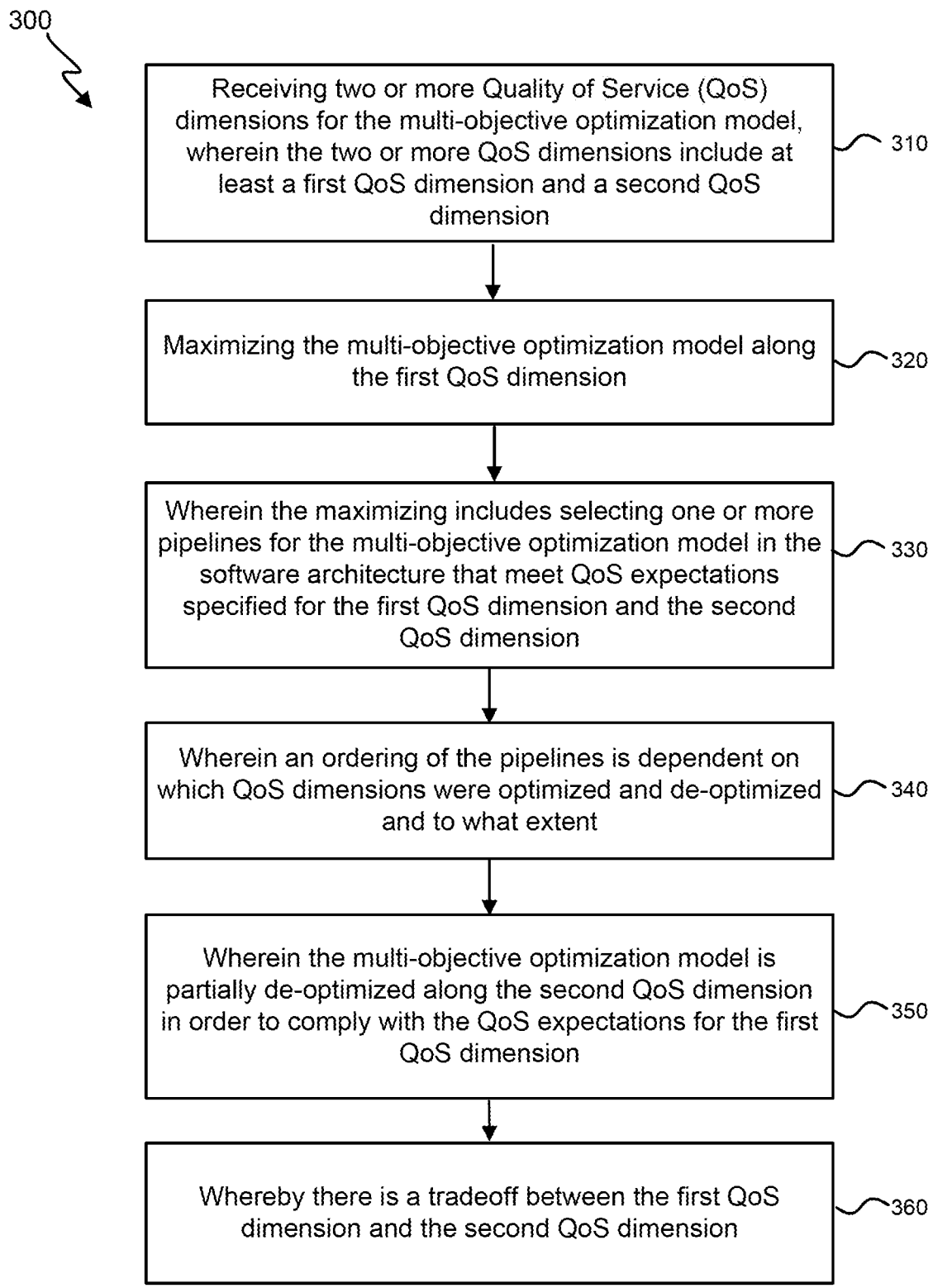
FIG. 3 illustrates an exemplary flow chart for service execution and monitoring for run-time service composition.

FIG. 3 illustrates an exemplary flow chart for service execution and monitoring for run-time service composition.

FIG. 3 is a flow chart of an example process 300 for techniques for service execution and monitoring for run-time service composition. In some implementations, one or more process blocks of FIG. 3 can be performed by a server system (e.g., a cloud-based server system). In some implementations, one or more process blocks of FIG. 3 can be performed by another device or a group of devices separate from or including the cloud-based server.

Figure 6:
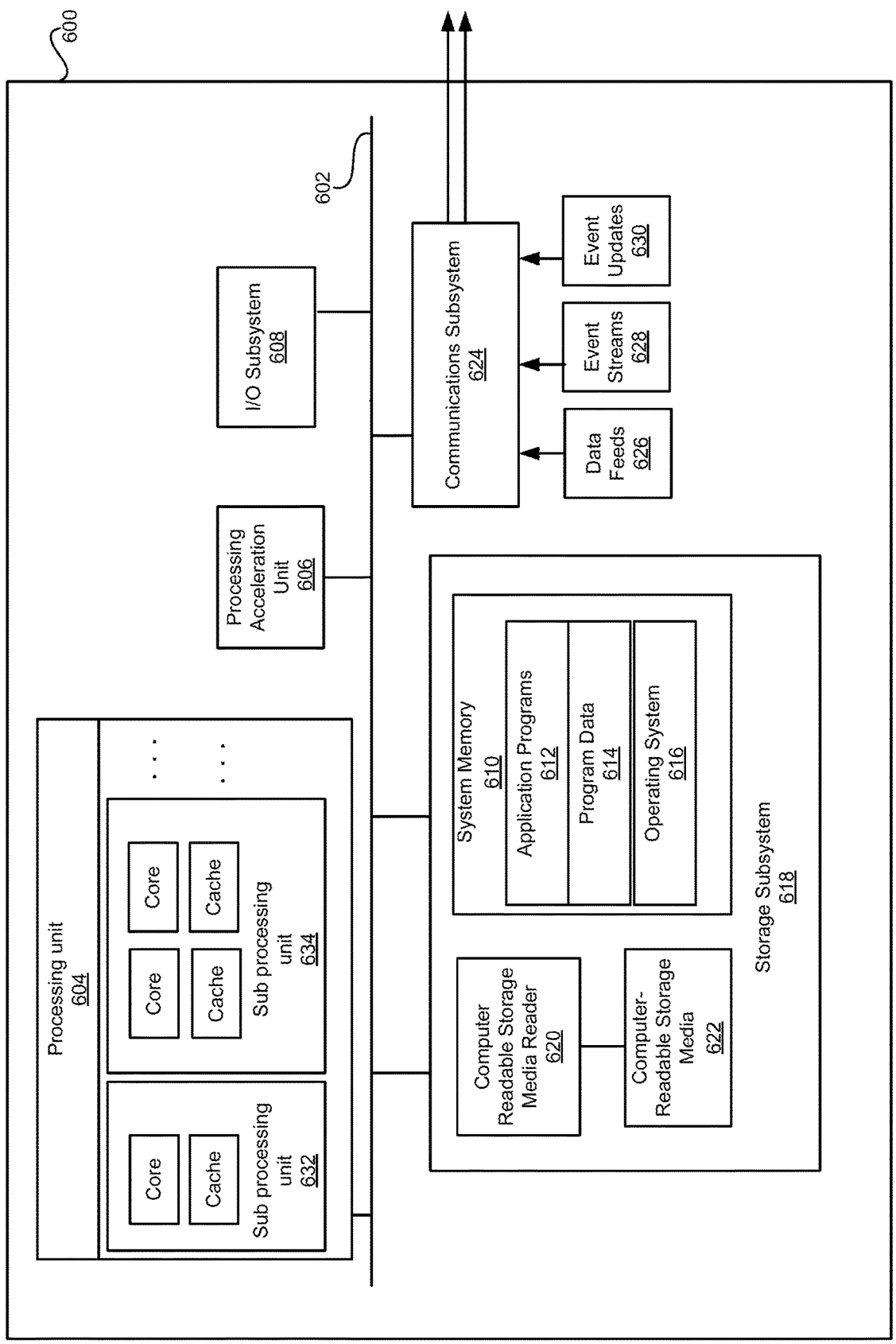
FIG. 6 illustrates an exemplary computer system, in which various embodiments of the present disclosure may be implemented.

At 310, process 300 can include receiving two or more Quality of Service (QoS) dimensions for the multi-objective optimization model, wherein the two or more QoS dimensions include at least a first QoS dimension and a second QoS dimension. For example, the server system (e.g., using processing unit 604, storage subsystem 618, system memory 610, communication subsystem 624, bus 602 and or data feeds 624 and/or the like as illustrated in FIG. 6 and described below) can receive two or more Quality of Service (QoS) dimensions for the multi-objective optimization model, as described above. In some implementations, the two or more QoS dimensions include at least a first QoS dimension and a second QoS dimension.

At 320, process 300 can include maximizing the multi-objective optimization model along the first QoS dimension. For example, the server system (e.g., using processing unit 604, storage subsystem 618, system memory 610, communication subsystem 624, bus 602 and or data feeds 624 and/or the like as illustrated in FIG. 6 and described below) can maximize the multi-objective optimization model along the first QoS dimension, as described above.

At 330, the maximizing can include selecting one or more pipelines for the multi-objective optimization model in the software architecture that meet QoS expectations specified for the first QoS dimension and the second QoS dimension. For example, the server system (e.g., using processing unit 604, storage subsystem 618, system memory 610, communication subsystem 624, bus 602 and or data feeds 624 and/or the like as illustrated in FIG. 6 and described below) can include selecting one or more pipelines for the multi-objective optimization model in the software architecture that meet QoS expectations specified for the first QoS dimension and the second QoS dimension.

At 340, an ordering of the pipelines is dependent on which QoS dimensions were optimized and de-optimized and to what extent. For example, the server system (e.g., using processing unit 604, storage subsystem 618, system memory 610, communication subsystem 624, bus 602 and or data feeds 624 and/or the like as illustrated in FIG. 6 and described below) can include ordering of the pipelines is dependent on which QoS dimensions were optimized and de-optimized and to what extent.

At 350, the multi-objective optimization model is partially de-optimized along the second QoS dimension in order to comply with the QoS expectations for the first QoS dimension. For example, the server system (e.g., using processing unit 604, storage subsystem 618, system memory 610, communication subsystem 624, bus 602 and or data feeds 624 and/or the like as illustrated in FIG. 6 and described below) can include partially de-optimized along the second QoS dimension in order to comply with the QoS expectations for the first QoS dimension.

At 360, there is a tradeoff between the first QoS dimension and the second QoS dimension. For example, the server system (e.g., using processing unit 604, storage subsystem 618, system memory 610, communication subsystem 624, bus 602 and or data feeds 624 and/or the like as illustrated in FIG. 6 and described below) can include tradeoffs between the first QoS dimension and the second QoS dimension.

In various embodiments, process 300 can include retrieving data associated with a historical output of a machine-learning model. For example, the server system (e.g., using processing unit 604, storage subsystem 618, system memory 610, communication subsystem 624, bus 602 and or data feeds 624 and/or the like as illustrated in FIG. 6 and described below) can retrieve data associated with a historical output of a machine-learning model as compared with a set of Quality of Service metrics and Key Performance Indicator Metrics, as described above.

In various embodiments, process 300 can include receiving one or more inputs from an environment monitoring agent, wherein the environment monitoring agent receives information on at least one of: resources of a system, concepts of the machine-learning model, data corruption, and data availability to the machine-learning model. For example, the server system (e.g., using processing unit 604, storage subsystem 618, system memory 610, communication subsystem 624, bus 602 and or data feeds 624 and/or the like as illustrated in FIG. 6 and described below) can receive one or more inputs from an environment monitoring agent, as described above. In some implementations, the environment monitoring agent receives information on at least one of: resources of a system, concepts of the machine-learning model, data corruption, and data availability to the machine-learning model.

In various embodiments, process 300 can include determining a change in at least one of: the resources of the system, the concepts of the machine-learning model, the data corruption, and the data availability to the machine-learning model. For example, the server system (e.g., using processing unit 604, storage subsystem 618, system memory 610, communication subsystem 624, bus 602 and or data feeds 624 and/or the like as illustrated in FIG. 6 and described below) can determine a change in at least one of: the resources of the system, the concepts of the machine-learning model, the data corruption, and the data availability to the machine-learning model, as described above. For example, the system can detect the loss of several processing units. In another example, the system can detect data corruption in the client data. In other examples, new customer data, potentially new types of data, may become available during the model execution.

In various embodiments, process 300 can include determining whether the change in the at least one of the resources of the system, the concepts of the machine-learning model, the data corruption, and the data availability to the machine-learning model will cause a predicted output of the machine-learning model to vary more than a predetermined amount. For example, the server system (e.g., using processing unit 604, storage subsystem 618, system memory 610, communication subsystem 624, bus 602 and or data feeds 624 and/or the like as illustrated in FIG. 6 and described below) can determine whether the change in the at least one of the resources of the system, the concepts of the machine-learning model, the data corruption, and the data availability to the machine-learning model will cause a predicted output of the machine-learning model to vary more than a predetermined amount, as described above. In some cases the predetermined amount may be a percentage difference (i.e., 10%) from a historical output. In other cases, the predetermined amount can be compared to KPIs or QoS metrics.

In various embodiments, process 300 can include when the change in the at least one of the resources of the system, the concepts of the machine-learning model, the data corruption, and the data availability to the machine-learning model will cause the predicted output of the machine-learning model to vary more than a predetermined amount, identifying one or more remedial measures to the machine-learning model to correct for the change. For example, the server system (e.g., using processing unit 604, storage subsystem 618, system memory 610, communication subsystem 624, bus 602 and or data feeds 624 and/or the like as illustrated in FIG. 6 and described below) can when the change in the at least one of the resources of the system, the concepts of the machine-learning model, the data corruption, and the data availability to the machine-learning model will cause the predicted output of the machine-learning model to vary more than a predetermined amount, identifying one or more remedial measures to the machine-learning model to correct for the change, as described above. The system can include a plurality of remedial measures stored. The remedial measures can be coded with metadata that identifies one or more changes that the remedial measures can be used.

In various embodiments, process 300 can include displaying an alert to notify a user of the change in the at least one of the resources of the system, the concepts of the machine-learning model, the data corruption, and the data availability to the machine-learning model and the one or more remedial measures. For example, the server system (e.g., using processing unit 604, storage subsystem 618, system memory 610, communication subsystem 624, bus 602 and or data feeds 624 and/or the like as illustrated in FIG. 6 and described below) can display an alert to notify a user of the change in the at least one of the resources of the system, the concepts of the machine-learning model, the data corruption, and the data availability to the machine-learning model and the one or more remedial measures, as described above.

Process 300 can include additional implementations, such as any single implementation or any combination of implementations described below and/or in connection with one or more other processes described elsewhere herein. It should be appreciated that the specific steps illustrated in FIG. 3 provide particular techniques for techniques for service execution and monitoring for run-time service composition according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 3 can include multiple sub-steps that can be performed in various sequences as appropriate to the individual step. Furthermore, additional steps can be added or removed depending on the particular applications. One of ordinary skill in the art would recognize many variations, modifications, and alternatives.

In some implementations, the predicted output includes at least one of first metrics related to a performance of the multi-objective optimization model in relation to Quality of Service parameters and second metrics related to predictions of the multi-objective optimization model as compared with the historical output of the multi-objective optimization model.

In some implementations, process 300 includes executing the one or more remedial measures to the machine-learning model to correct for the change.

In some implementations, the resources of the system comprises at least one of available memory, processing nodes, and network bandwidth.

In some implementations, the concepts measure a statistical distribution of a performance of the machine-learning model.

In some implementations, the data availability includes new data for one or more new features.

In some implementations, the one or more remedial measures to the machine-learning model includes reducing a complexity of the machine-learning model.

In some implementations, the one or more remedial measures to the machine-learning model includes eliminating one or more features affected by the data corruption.

In some implementations, the one or more remedial measures to the machine-learning model includes evaluating impact of new features on the predict output.

In some implementations, the one or more remedial measures to the machine-learning model includes rolling back the machine-learning model to a previous version.

In some implementations, the one or more remedial measures includes at least one of composing a new model pipeline and replacing a machine-learning model microservice.

In various embodiments, a server device can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of a computing device, cause the one or more processors to perform operations of any of the methods described above.

Although FIG. 3 shows example steps of process 300, in some implementations, process 300 can include additional steps, fewer steps, different steps, or differently arranged steps than those depicted in FIG. 3. Additionally, or alternatively, two or more of the steps of process 300 can be performed in parallel.

III. Exemplary Hardware and Software Configurations

Figure 4:
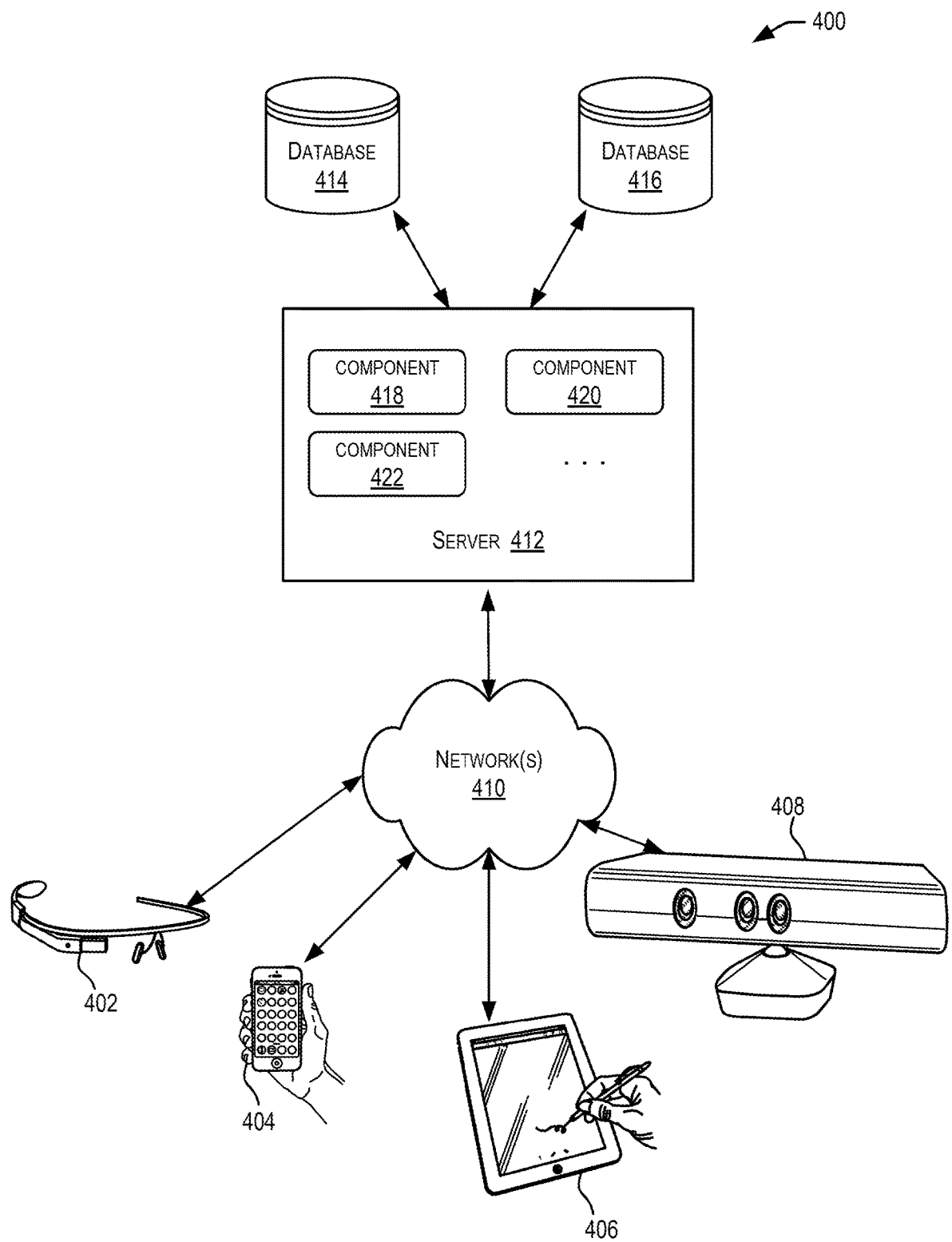
FIG. 4 is a simplified diagram illustrating a distributed system for implementing one of the embodiments.

FIG. 4 depicts a simplified diagram of a distributed system 400 for implementing one of the embodiments. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications provided by one or more of the components of the system. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in the figure, the software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in the figure is thus one example of a distributed system for implementing an embodiment system and is not intended to be limiting.

Client computing devices 402, 404, 406, and/or 408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 402, 404, 406, and 408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 410.

Although exemplary distributed system 400 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), such as one based on Ethernet, Token-Ring and/or the like. Network(s) 410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure. For example, server 412 may correspond to a server for performing processing described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
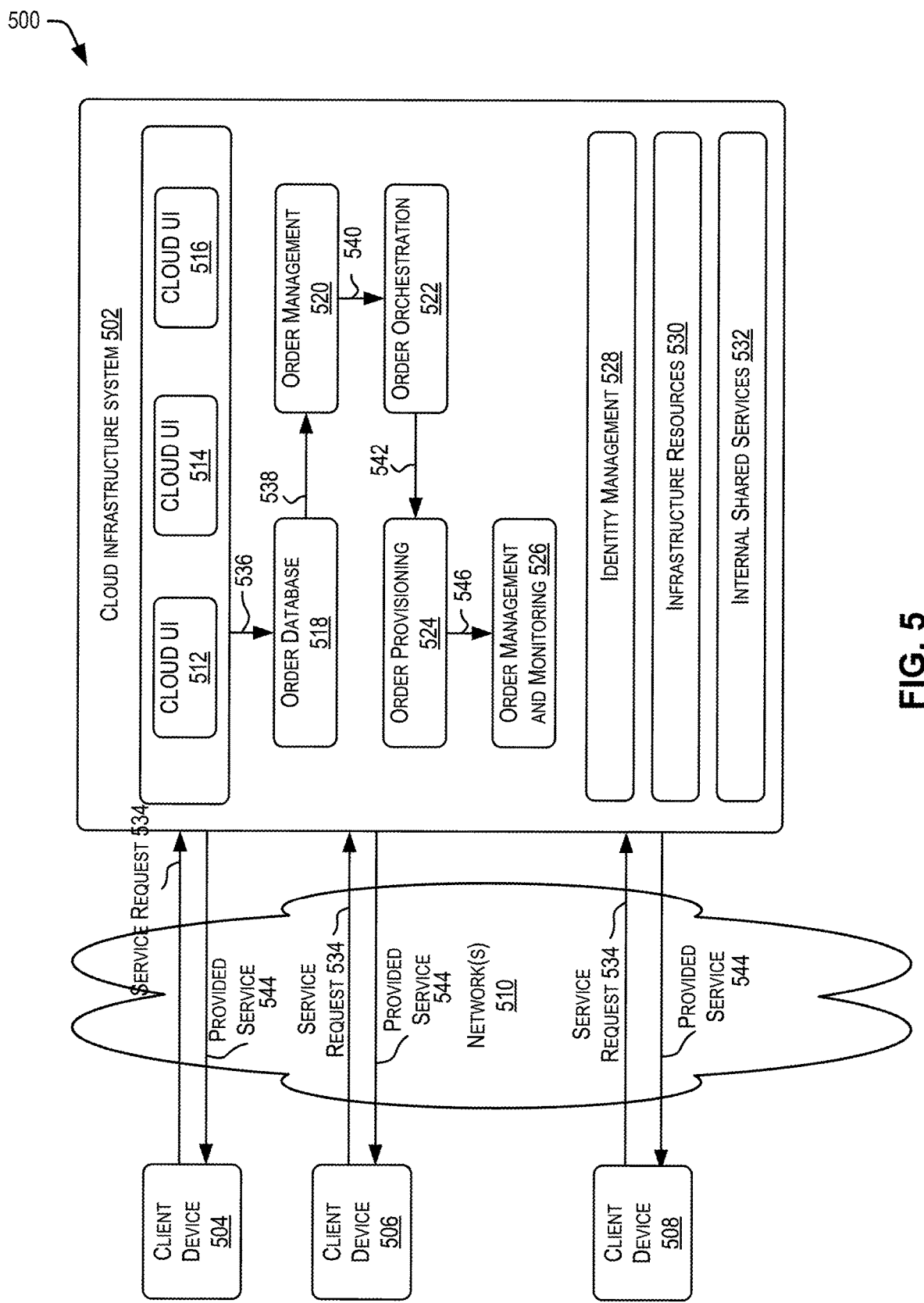
FIG. 5 is a simplified block diagram illustrating one or more components of a system environment.

FIG. 5 is a simplified block diagram of one or more components of a system environment 500 by which services provided by one or more components of an embodiment system may be offered as cloud services, in accordance with an embodiment of the present disclosure. In the illustrated embodiment, system environment 500 includes one or more client computing devices 504, 506, and 508 that may be used by users to interact with a cloud infrastructure system 502 that provides cloud services. The client computing devices may be configured to operate a client application such as a web browser, a proprietary client application (e.g., Oracle Forms), or some other application, which may be used by a user of the client computing device to interact with cloud infrastructure system 502 to use services provided by cloud infrastructure system 502.

It should be appreciated that cloud infrastructure system 502 depicted in the figure may have other components than those depicted. Further, the embodiment shown in the figure is only one example of a cloud infrastructure system that may incorporate an embodiment of the disclosure. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408.

Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially available protocols, including those described above for network(s) 410.

Cloud infrastructure system 502 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 530 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform.

In some embodiments, resources in cloud infrastructure system 502 may be shared by multiple users and dynamically re-allocated per demand. Additionally, resources may be allocated to users in different time zones. For example, cloud infrastructure system 530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 and by the services provided by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in the figure, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In exemplary operation 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI), cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

After an order has been placed by the customer, the order information is received via the cloud UIs, 512, 514 and/or 516.

At operation 536, the order is stored in order database 518. Order database 518 can be one of several databases operated by cloud infrastructure system and operated in conjunction with other system elements.

At operation 538, the order information is forwarded to an order management module 520. In some instances, order management module 520 may be configured to perform billing and accounting functions related to the order, such as verifying the order, and upon verification, booking the order.

At operation 540, information regarding the order is communicated to an order orchestration module 522. Order orchestration module 522 may utilize the order information to orchestrate the provisioning of services and resources for the order placed by the customer. In some instances, order orchestration module 522 may orchestrate the provisioning of resources to support the subscribed services using the services of order provisioning module 524.

In certain embodiments, order orchestration module 522 enables the management of processes associated with each order and applies logic to determine whether an order should proceed to provisioning. At operation 542, upon receiving an order for a new subscription, order orchestration module 522 sends a request to order provisioning module 524 to allocate resources and configure those resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. Order orchestration module 522 may thus be isolated from implementation details, such as whether or not services and resources are actually provisioned on the fly or pre-provisioned and only allocated/assigned upon request.

At operation 544, once the services and resources are provisioned, a notification of the provided service may be sent to customers on client devices 504, 506 and/or 508 by order provisioning module 524 of cloud infrastructure system 502.

At operation 546, the customer's subscription order may be managed and tracked by an order management and monitoring module 526. In some instances, order management and monitoring module 526 may be configured to collect usage statistics for the services in the subscription order, such as the amount of storage used, the amount data transferred, the number of users, and the amount of system up time and system down time.

In certain embodiments, cloud infrastructure system 500 may include an identity management module 528. Identity management module 528 may be configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

FIG. 6 illustrates an exemplary computer system 600, in which various embodiments of the present disclosure may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an input/output (I/O) subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processing unit 604 and/or in storage subsystem 618. Through suitable programming, processing unit 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as musical instrument digital interface (MIDI) keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present disclosure.

Storage subsystem 618 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc-read-only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for automating a run-time adaption of a multi-objective optimization model in a software architecture, the method comprising:
    accessing the multi-objective optimization model, wherein the multi-objective optimization model is configured to access one or more library components that are configured based on a user data schema and one or more data ontologies;
    receiving two or more Quality of Service (QoS) dimensions for the multi-objective optimization model at run-time,
        wherein QoS dimensions include a response time, latency, throughput, availability, or success rate,
        wherein the two or more QoS dimensions include at least a first QoS dimension and a second QoS dimension;
    maximizing the multi-objective optimization model along the first QoS dimension at run-time,
        wherein the maximizing includes selecting two or more pipelines for the multi-objective optimization model in the software architecture that meet QoS expectations specified for the first QoS dimension and the second QoS dimension,
        wherein an ordering of the pipelines is dependent on which QoS dimensions were optimized and de-optimized and to what extent, the ordering of the pipelines includes ranking the two or more pipelines,
        wherein the multi-objective optimization model is partially de-optimized along the second QoS dimension in order to comply with the QoS expectations for the first QoS dimension, and
        whereby there is a tradeoff between the first QoS dimension and the second QoS dimension;
    detecting a predicted change in performance or a predicted output of the multi-objective optimization model; and
    transmitting a notification indicating the predicted change.

2. The method of claim 1, further comprising:
    retrieving data associated with a historical output of the multi-objective optimization model;
    receiving one or more inputs from an environment-monitoring agent, wherein the environment-monitoring agent receives information on at least one of: resources of a system, concepts of the multi-objective optimization model, data corruption, and data availability to the multi-objective optimization model;
    determining a change in at least one of: the resources of the system, the concepts of the multi-objective optimization model, the data corruption, and the data availability to the multi-objective optimization model;
    determining whether the change in the at least one of the resources of the system, the concepts of the multi-objective optimization model, the data corruption, and the data availability to the multi-objective optimization model will cause a predicted output of the multi-objective optimization model to vary more than a predetermined amount;
    when the change in the at least one of the resources of the system, the concepts of the multi-objective optimization model, the data corruption, and the data availability to the multi-objective optimization model cause the predicted output of the multi-objective optimization model to vary more than a predetermined amount, identifying one or more remedial measures to the multi-objective optimization model to correct for the change; and
    displaying an alert to notify a user of the change in the at least one of the resources of the system, the concepts of the multi-objective optimization model, the data corruption, and the data availability to the multi-objective optimization model and the one or more remedial measures.

3. The method of claim 2, wherein the predicted output includes at least one of first metrics related to a performance of the multi-objective optimization model in relation to Quality of Service parameters and second metrics related to predictions of the multi-objective optimization model as compared with the historical output of the multi-objective optimization model.

4. The method of claim 2, further comprising executing the one or more remedial measures to the multi-objective optimization model to correct for the change.

5. The method of claim 2, wherein the resources of the system comprises at least one of available memory, processing nodes, and network bandwidth.

6. The method of claim 2, wherein the concepts measure a statistical distribution of a performance of the multi-objective optimization model.

7. The method of claim 2, wherein the one or more remedial measures to the multi-objective optimization model includes reducing a complexity of the multi-objective optimization model.

8. The method of claim 2, wherein the one or more remedial measures to the multi-objective optimization model includes eliminating one or more features affected by the data corruption.

9. The method of claim 2, wherein the one or more remedial measures to the multi-objective optimization model includes evaluating impact of new features on the predicted output.

10. The method of claim 2, wherein the one or more remedial measures to the multi-objective optimization model includes rolling back the multi-objective optimization model to a previous version.

11. A non-transitory computer-readable medium storing instructions for automating a run-time adaption of a multi-objective optimization model in a software architecture, the instructions comprising:
    one or more instructions that, when executed by one or more processors, cause the one or more processors to:
        access the multi-objective optimization model, wherein the multi-objective optimization model is configured to access one or more library components that are configured based on a user data schema and one or more data ontologies;
        receive two or more Quality of Service (QoS) dimensions for the multi-objective optimization model at run-time,
            wherein QoS dimensions include a response time, latency, throughput, availability, or success rate,
            wherein the two or more QoS dimensions include at least a first QoS dimension and a second QoS dimension;
        maximize the multi-objective optimization model along the first QoS dimension at run-time,
            wherein the maximizing includes selecting two or more pipelines for the multi-objective optimization model in the software architecture that meet QoS expectations specified for the first QoS dimension and the second QoS dimension, wherein an ordering of the pipelines is dependent on which QoS dimensions were optimized and de-optimized and to what extent, the ordering of the pipelines includes ranking the two or more pipelines, wherein the multi-objective optimization model is partially de-optimized along the second QoS dimension in order to comply with the QoS expectations for the first QoS dimension, and whereby there is a tradeoff between the first QoS dimension and the second QoS dimension;

detect a predicted change in performance or a predicted output of the multi-objective optimization model; and transmit a notification indicating the predicted change.

12. The non-transitory computer-readable medium of claim 11, further comprising instructions that, when executed by one or more processors, cause the one or more processors to:

retrieve data associated with a historical output of the multi-objective optimization model;

receive one or more inputs from an environment-monitoring agent, wherein the environment-monitoring agent receives information on at least one of: resources of a system, concepts of the multi-objective optimization model, data corruption, and data availability to the multi-objective optimization model;

determine a change in at least one of: the resources of the system, the concepts of the multi-objective optimization model, the data corruption, and the data availability to the multi-objective optimization model;

determine whether the change in the at least one of the resources of the system, the concepts of the multi-objective optimization model, the data corruption, and the data availability to the multi-objective optimization model will cause a predicted output of the multi-objective optimization model to vary more than a predetermined amount;

when the change in the at least one of the resources of the system, the concepts of the multi-objective optimization model, the data corruption, and the data availability to the multi-objective optimization model will cause the predicted output of the multi-objective optimization model to vary more than a predetermined amount, identifying one or more remedial measures to the multi-objective optimization model to correct for the change; and display an alert to notify a user of the change in the at least one of the resources of the system, the concepts of the multi-objective optimization model, the data corruption, and the data availability to the multi-objective optimization model and the one or more remedial measures.

13. The non-transitory computer-readable medium of claim 12, wherein the predicted output includes at least one of first metrics related to a performance of the multi-objective optimization model in relation to Quality of Service parameters and second metrics related to predictions of the multi-objective optimization model as compared with the historical output of the multi-objective optimization model.

14. The non-transitory computer-readable medium of claim 12, further comprising executing the one or more remedial measures to the multi-objective optimization model to correct for the change.

15. The non-transitory computer-readable medium of claim 12, wherein the resources of the system comprise at least one of available memory, processing nodes, and network bandwidth.

16. The non-transitory computer-readable medium of claim 12, wherein the concepts measure a statistical distribution of a performance of the multi-objective optimization model.

17. The non-transitory computer-readable medium of claim 12, wherein the data availability includes new data for one or more new features.

18. The non-transitory computer-readable medium of claim 12, wherein the one or more remedial measures to the multi-objective optimization model includes reducing a complexity of the multi-objective optimization model.

19. The non-transitory computer-readable medium of claim 12, wherein the one or more remedial measures to the multi-objective optimization model includes eliminating one or more features affected by the data corruption.

20. The non-transitory computer-readable medium of claim 12, wherein the one or more remedial measures to the multi-objective optimization model includes evaluating impact of new features on the predict output.

* * * * *